United States Patent
Takahashi et al.

(10) Patent No.: US 6,750,853 B2
(45) Date of Patent: Jun. 15, 2004

(54) TOUCH PANEL DEVICE

(75) Inventors: Yuji Takahashi, Kawasaki (JP); Fumihiko Nakazawa, Kawasaki (JP); Satoshi Sano, Kawasaki (JP); Takashi Katsuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 284 days.

(21) Appl. No.: 09/960,957

(22) Filed: Sep. 25, 2001

(65) Prior Publication Data
US 2002/0171635 A1 Nov. 21, 2002

(30) Foreign Application Priority Data
May 15, 2001 (JP) .................................. 2001-145481

(51) Int. Cl.[7] .................................................. G09G 5/00
(52) U.S. Cl. ..................................... 345/177; 178/18.04
(58) Field of Search ............................... 345/173–178; 178/18.01, 18.04, 18.09

(56) References Cited

U.S. PATENT DOCUMENTS

| 5,708,461 | A |   | 1/1998  | Kent |               |
|-----------|---|---|---------|------|---------------|
| 5,717,434 | A | * | 2/1998  | Toda | 345/177       |
| 5,838,088 | A | * | 11/1998 | Toda | 310/313 R     |
| 5,973,438 | A | * | 10/1999 | Toda | 310/313 B     |
| 6,078,315 | A |   | 6/2000  | Huang |              |
| 2003/0038789 | A1 | * | 2/2003 | Nakazawa et al. | 345/173 |

FOREIGN PATENT DOCUMENTS

EP         0 397 539         11/1990

* cited by examiner

*Primary Examiner*—Regina Liang
(74) *Attorney, Agent, or Firm*—Westerman, Hattori, Daniels & Adrian, LLP

(57) ABSTRACT

A surface acoustic waves is excited from an excitation element disposed on a substrate, the surface acoustic wave propagated on the substrate is received by a receiving element positioned on the substrate so as to face the excitation element, and the position of an object touching the substrate is detected based on the reception result. The wave number of a burst wave applied to excite the excitation element is made equal to the number of the comb-like electrode fingers of an IDT of the excitation element.

18 Claims, 19 Drawing Sheets

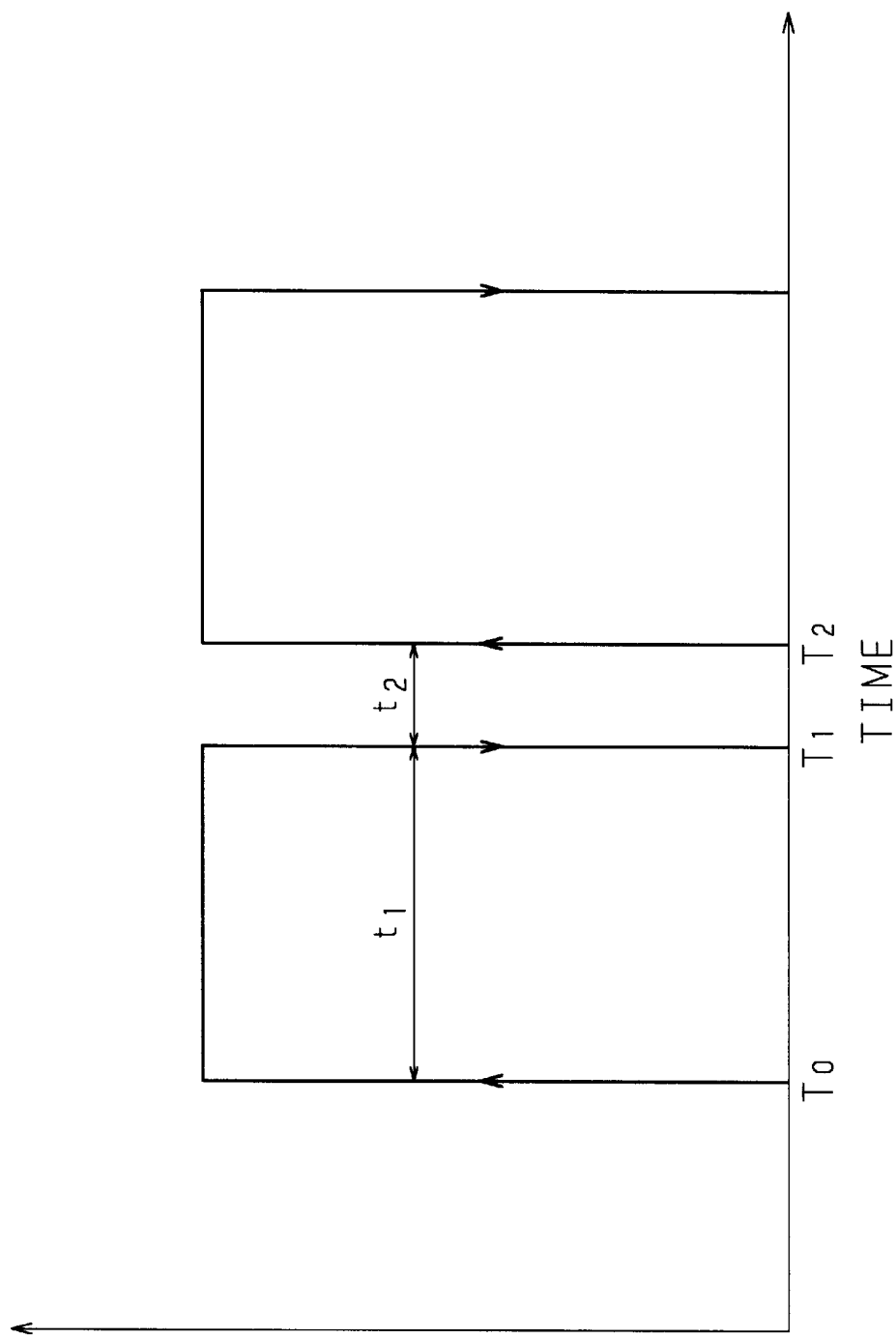

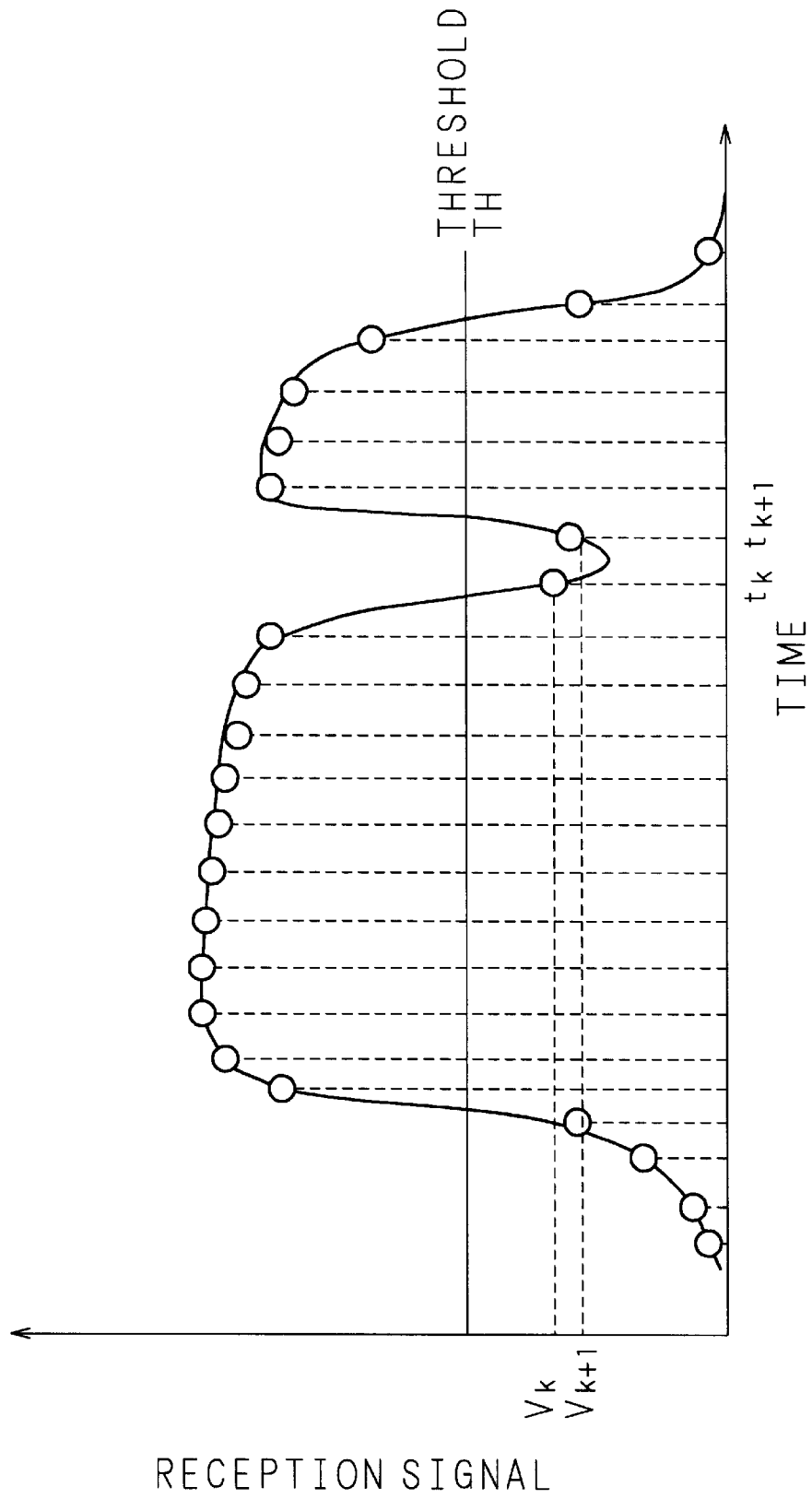

TOUCH PANEL DEVICE

BACKGROUND OF THE INVENTION

The present invention relates to a touch panel device for detecting the touch of an object, such as a finger and a pen, on the touch panel device, and more particularly relates to a touch panel device using IDTs (Inter Digital Transducers), for detecting the touched position by detecting attenuation and cutoff of surface acoustic wave (SAW).

With the spread of computer systems, mainly personal computers, there has been used a device for inputting new information or giving various instructions to a computer system by pointing at a position on a display screen of a display device on which information is displayed by the computer system, with a finger or a pen. In order to perform an input operation with respect to the information displayed on the display screen of the display device of a personal computer or the like by a touching method, it is necessary to detect a touched position (indicated position) on the display screen with high accuracy.

Well known examples of touch panel device for detecting a position touched by an object such as a finger and a pen are a device using a resistance film, and a device using ultrasonic waves. In the former device using a resistance film, a change in the resistance of the resistance film caused by the touch of the object on the resistance film is detected. This device has the advantage of low consumption of power, but has the problems in the aspects of the response time, detection performance and durability.

By contrast, in the device using ultrasonic waves, a position touched by the object is detected by propagating surface acoustic waves along a non-piezoelectric substrate, for example, and detecting attenuation of the surface acoustic waves caused by the touch of the object such as a finger and a pen on the non-piezoelectric substrate.

FIG. 1 is an illustration showing the structure of such a conventional touch panel device using surface acoustic waves (the first conventional example). A first surface acoustic wave oscillator 52a and a second surface acoustic wave oscillator 52b are provided at the upper left corner of a rectangular panel 51, a first surface acoustic wave receiver 53a is disposed at the lower left corner thereof, and a second surface acoustic wave receiver 53b is positioned at the upper right corner thereof. Moreover, reflectors 54a, 54b, 54c and 54d whose reflection surfaces are formed at an equal pitch are disposed at the four sides of the panel 51, that is, the upper side, lower side, left side and right side, respectively.

Here, a surface acoustic wave excited by the first surface acoustic wave oscillator 52a is reflected by the reflection surfaces of the reflector 54a, scanned and propagated on the panel 51 in a vertical direction (Y-axis direction), further reflected by the reflection surfaces of the reflector 54b, and then received by the first surface acoustic wave receiver 53a. Meanwhile, a surface acoustic wave excited by the second surface acoustic wave oscillator 52b is reflected by the reflection surfaces of the reflector 54c, scanned and propagated on the panel 51 in a lateral direction (X-axis direction), further reflected by the reflection surfaces of the reflector 54d, and then received by the second surface acoustic wave receiver 53b. FIG. 2 illustrates how such a surface acoustic wave is propagated.

In this example, since the surface acoustic waves enter each receiver after being reflected twice, they reach each receiver at intervals of $t_i=2D/V_s$ (D: the reflection surfaces formation pitch, $V_s$: the propagation speed of the surface acoustic waves). FIG. 3 shows a time-series reception signal obtained by each receiver at this time. When an object is touching the panel 51, since the level of the reception signal corresponding to that position is attenuated, it is possible to detect whether the panel 51 is touched by the object and the touched position by analyzing such a reception signal.

In order to increase the time resolution, i.e., in order to enable detection in a short time, a technique of shortening $t_R$ of FIG. 3 by increasing the propagation speed of the surface acoustic waves may be used; and in order to increase the spatial resolution, a technique of reducing the reflection surfaces formation pitch D may be employed. In order to detect the touched position with high precision, it is necessary to totally improve both of the time resolution and spatial resolution.

FIG. 4 shows a structural example of the first and second surface acoustic wave oscillators 52a and 52b. The surface acoustic wave is excited by applying a voltage through an electrode 56 to a wedge-shaped piezoelectric body 55 fabricated on the panel 51. Since the speed of this surface acoustic wave depends on the piezoelectric body 55, it is impossible to increase the speed. Moreover, in general, since the reflectors 54a, 54b, 54c and 54d are fabricated by cutting work, it is not easy to form the reflection surfaces at a very small pitch. It is thus difficult to improve the time resolution and spatial resolution and detect the touched position with high precision.

In contrast to such a touch panel device, the present inventors are carrying out research and development of a touch panel device that requires no reflector and uses IDTs, capable of being formed collectively using a photolithography technique, as transducers. In this touch panel device, elements, each composed of an IDT and a piezoelectric thin film, are used as an excitation element for exciting a surface acoustic wave and a receiving element for receiving a propagated surface acoustic wave.

FIG. 5 is an illustration showing the structure of such a conventional touch panel device using the IDTs (the second conventional example). In FIG. 5, numeral 61 represents a rectangular non-piezoelectric substrate, and a plurality of excitation elements 62, each composed of an input IDT and a piezoelectric thin film, for exciting surface acoustic waves are arranged into a line on one end of each of the X-direction and Y-direction of the non-piezoelectric substrate 61 so that the excitation elements 62 correspond to a plurality of tracks, respectively. Moreover, a plurality of receiving elements 63, each composed of an output IDT and a piezoelectric thin film, for receiving the surface acoustic waves are arranged into a line on the other end of each of the X-direction and Y-direction of the non-piezoelectric substrate 61 so that the receiving elements 63 face the excitation elements 62.

In the touch panel device shown in FIG. 5 (hereinafter referred to as the "discrete-IDT type touch panel device"), a burst wave is applied to each excitation element 62 to excite the surface acoustic wave and propagate it along the non-piezoelectric substrate 61, and the propagated surface acoustic wave is received by each receiving element 63. Moreover, when an object touches the propagation path of the surface acoustic wave on the non-piezoelectric substrate 61, the surface acoustic wave is attenuated. Accordingly, it is possible to detect the presence or absence of the touch of the object and the touched position by detecting whether the reception signal level of the receiving elements 63 is attenuated or not.

In addition, the present inventors proposed a touch panel device (third conventional example) in which the excitation elements and the receiving elements are arranged so as to propagate surface acoustic waves in an oblique direction (diagonal direction) of the substrate. FIG. 6 is an illustration showing the structure of the IDTs of such a touch panel device (hereinafter referred to as the "inclined continuous-IDT type touch panel device"). An excitation element 72 is disposed at one peripheral portion of a rectangular substrate 71. This excitation element 72 has an IDT 76 comprising facing electrode bases 74 and a plurality of comb-like electrode fingers 75 extended from the electrode bases 74 alternately. Besides, a receiving element 73 disposed at a peripheral section of the substrate 71 adjacent to the excitation element 72 has an IDT 76 having the same structure as that in the excitation element 72. In each IDT 76, the comb-like electrode fingers 75 are extended from the electrode bases 74 in a direction inclined from the facing direction of the electrode bases 74, i.e., in such a manner that the electrode fingers 75 are inclined from a direction perpendicular to the surfaces of the electrode bases 74. In such a touch panel device, since the apertures are gradually shifted, it is possible to detect a position touched by the object continuously (in an analog manner).

In the discrete-IDT type touch panel device shown in FIG. 5, the spatial resolution is determined by the installation interval of the IDTs, and it is easy to achieve a small installation interval of the IDTs. In other words, if the remaining time resolution can be improved, it is possible to realize highly precise detection of the touched position. On the other hand, in the inclined continuous-IDT type touch panel device shown in FIG. 6, since the IDT has a continuous structure, the spatial resolution is not limited. Therefore, in this example, it is also possible to realize highly precise detection of the touched position by improving the time resolution. Accordingly, the present inventors continue to carry out the research about a technique for improving the time resolution.

BRIEF SUMMARY OF THE INVENTION

It is an object of the present invention to provide a touch panel device capable of improving the time resolution and realizing highly precise detection of a touched position.

Another object of the present invention is to provide a touch panel device capable of exciting a surface acoustic wave from an excitation element at an optimum frequency and achieving high gain reception.

Still another object of the present invention is to provide a touch panel device capable of preventing the influence of a reflected wave of a surface acoustic wave and accurately detecting a touched position.

Yet another object of the present invention is to provide a touch panel device capable of accurately detecting a touched position without receiving the influence of dirt and so on.

A touch panel device according to the first aspect is a touch panel device comprising at least one pair of excitation element for exciting a surface acoustic wave by application of a burst wave and receiving element for receiving the surface acoustic wave, on a substrate propagating the surface acoustic wave so that the excitation element and the receiving element face each other, each of the excitation element and the receiving element having an IDT composed of facing electrode bases and comb-like electrode fingers connected to the electrode bases, for detecting a position of an object touching the substrate by propagating the surface acoustic wave between the excitation element and the receiving element on the substrate and detecting the position based on a reception result at the receiving element, wherein a wave number of the burst wave to be applied to the excitation element is determined according to the number of the comb-like electrode fingers of the IDT of the excitation element.

A touch panel device according to the second aspect is a touch panel device comprising at least one pair of excitation element for exciting a surface acoustic wave by application of a burst wave and receiving element for receiving the surface acoustic wave, at peripheral sections in a diagonal direction of a rectangular substrate propagating the surface acoustic wave, each of the excitation element and the receiving element having an IDT composed of facing electrode bases and comb-like electrode fingers connected to the electrode bases, for detecting a position of an object touching the substrate by propagating the surface acoustic wave on the substrate in a diagonal direction between the excitation element and the receiving element and detecting the position based on a reception result at the receiving element, wherein the comb-like electrode fingers of the IDTs of the excitation element and the receiving element are connected to the electrode bases so that they are inclined from a facing direction of the electrode bases, and a wave number of the burst wave to be applied to the excitation element is determined according to an interval between the electrode bases of the IDT of the excitation element and an inclination angle and interval of the comb-like electrode fingers of the IDT of the excitation element.

A touch panel device according to the third aspect is a touch panel device comprising at least one pair of excitation element for exciting a surface acoustic wave by application of a burst wave and receiving element for receiving the surface acoustic wave, on a substrate propagating the surface acoustic wave so that the excitation element and the receiving element face each other, each of the excitation element and the receiving element having an IDT composed of facing electrode bases and comb-like electrode fingers connected to the electrode bases, for detecting a position of an object touching the substrate by propagating the surface acoustic wave between the excitation element and the receiving element on the substrate and detecting the position based on a reception result at the receiving element, wherein a wave number of the burst wave to be applied to the excitation element is determined according to a result of receiving the surface acoustic wave, which was excited by the application of the burst wave to the excitation element, at the receiving element.

The propagation speed of the surface acoustic wave is determined mainly by the type of a piezoelectric body, and the propagation time is determined by the size of the substrate. Accordingly, in order to improve the time resolution, i.e., in order to perform efficient detection within a short time, it is necessary to optimize the time taken for driving the IDT, i.e., the wave number of the burst wave, and therefore, in the first through third aspects, an optimum wave number of the burst wave is determined.

In the first aspect, noting the reception signal gain and the number of the comb-like electrode fingers of the IDT in a discrete-IDT type touch panel device, the wave number of the burst wave is determined according to the number of the comb-like electrode fingers of the IDT. The maximum gain of the reception signal is obtained by applying the same number of burst wave as the number of the comb-like electrode fingers, and, when a burst wave number equal to or more than the number of comb-like electrode fingers is applied, the reception signal gain is fixed. Therefore, by arranging the wave number of the applied burst wave to be equal to the number of the comb-like electrode fingers, the wave number of the burst wave is optimized, thereby achieving highly accurate detection and high time resolution.

Moreover, according to the second aspect, even if the touch panel device is of an inclined continuous-IDT type, the wave number of the burst wave is determined by considering the maximum reception signal gain, but, in this case, the wave number of the burst wave is determined according to the interval of the electrode bases and the inclination angle and interval of the comb-like electrode fingers of the IDT. It is therefore possible to obtain an optimum wave number of the burst wave and increase the time resolution.

Furthermore, according to the third aspect, for example, during activation of the device, the burst wave is applied to the excitation element to excite the surface acoustic wave, the excited surface acoustic wave is received by the receiving element, and the optimum wave number of the burst wave is determined according to the reception result. For instance, the wave number of the burst wave that causes the reception result to show the maximum value is determined as the optimum wave number. Accordingly, it is possible to obtain an optimum burst wave number according to the operating environment and operating condition, thereby increasing the time resolution.

A touch panel device according to the fourth aspect is based on any one of the first through third aspects, wherein a drive frequency of the IDT of the excitation element is determined according to results of receiving surface acoustic waves, which were excited at different frequencies by the excitation element, at the receiving element. According to the fourth aspect, for example, during activation of the device, the IDT is driven at different frequencies in the vicinity of the initially set frequency to excite the excitation element, the excited surface acoustic wave is received by the receiving element, and a frequency that causes the reception result to show the maximum value is determined as the optimum frequency. It is therefore possible to always achieve high gain reception even when the operating environment and operating condition change.

A touch panel device according to the fifth aspect is based on any one of the first through fourth aspects, wherein a time interval between sequential burst waves to be applied to the excitation element is not less than a reception time of the surface acoustic wave at the receiving element. It has been considered that the surface acoustic wave excited by the excitation element is reflected by the receiving element and the reflected wave enters the excitation element and viciously affects the detection accuracy. According to the fifth aspect, in order to reduce such influence of the reflected wave, the burst wave is applied to the excitation element so that the burst wave interval is not less than the reception time of the surface acoustic wave at the receiving element.

A touch panel device according to the sixth aspect is based on any one of the first through fifth aspects, wherein a reception signal obtained by the receiving element is binarized based on a predetermined threshold, and the position of the object is detected based on the binarization result. According to the sixth aspect, the reception signal obtained by the receiving element is binarized based on the predetermined threshold, and the position of the object is detected based on the binarization result. It is therefore possible to detect the touched position by simple processes.

A touch panel device according to the seventh aspect is based on the sixth aspect, wherein the position of the object is detected based on a first timing representing a transition from rise to fall of a binarized signal obtained by binarizing the reception signal obtained by the receiving element based on the predetermined threshold, and the width of the object is detected based on the first timing and a second timing representing a transition from fall to rise of the binarized signal. According to the seventh aspect, the first timing representing a transition from rise to fall in the binarization result of the reception signal based on the threshold and the second timing representing a transition from fall to rise are detected, the touched position is obtained by multiplying the time of the first timing by the speed of the surface acoustic wave, and the width of the object is obtained by multiplying the time difference between the first and second timings by the speed of the surface acoustic wave. It is therefore possible to simply detect the touched position and width of the object.

A touch panel device according to the eighth aspect is based on the sixth or seventh aspect, wherein a plurality of sampling points are extracted for the reception signal obtained by the receiving element, and the threshold for use in the binarization is set individually for each of the plurality of sampling points. According to the eighth aspect, the threshold for use in the binarization is set individually for each of the plurality of sampling points. For example, for a portion where the substrate itself is dirty and the surface acoustic wave is attenuated even when the object is not present, a lower threshold than in other portions is set. It is therefore possible to prevent erroneous detection due to dirt and perform accurate detection.

The above and further objects and features of the invention will more fully be apparent from the following detailed description with accompanying drawings.

BRIEF DESCRIPTION OF THE SEVERAL VIEWS OF THE DRAWINGS

FIG. 18 is an illustration showing a binarization result of the reception signal; and FIG. 19. is an illustration showing the result of sampling the reception signal when the substrate is dirty.

DETAILED DESCRIPTION OF THE INVENTION

The following description will explain the present invention in detail with reference to the drawings illustrating some embodiments thereof.

(First Embodiment)

Figure 1:
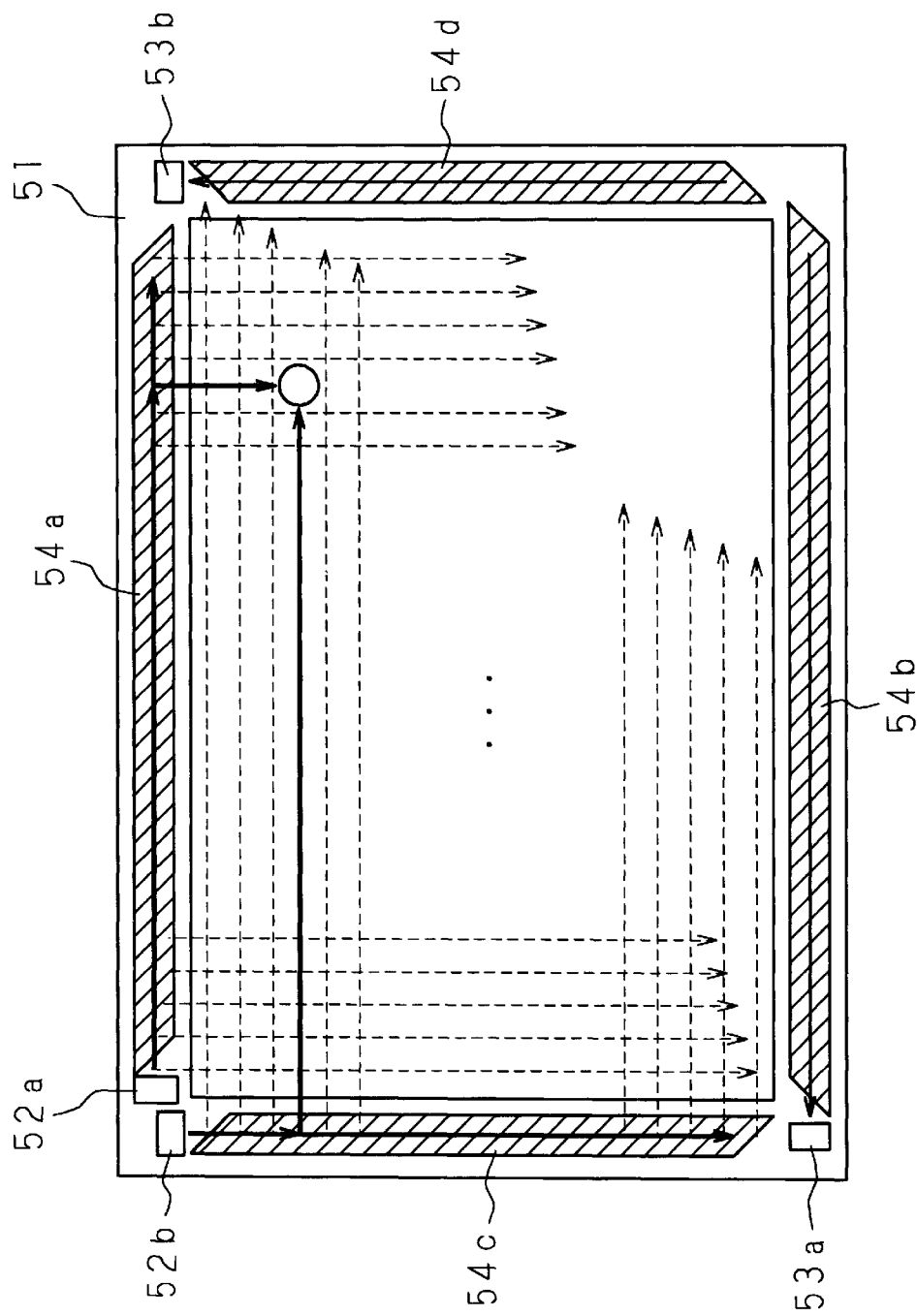
FIG. 1 is an illustration showing the structure of a conventional touch panel device (the first conventional example)
Figure 2:
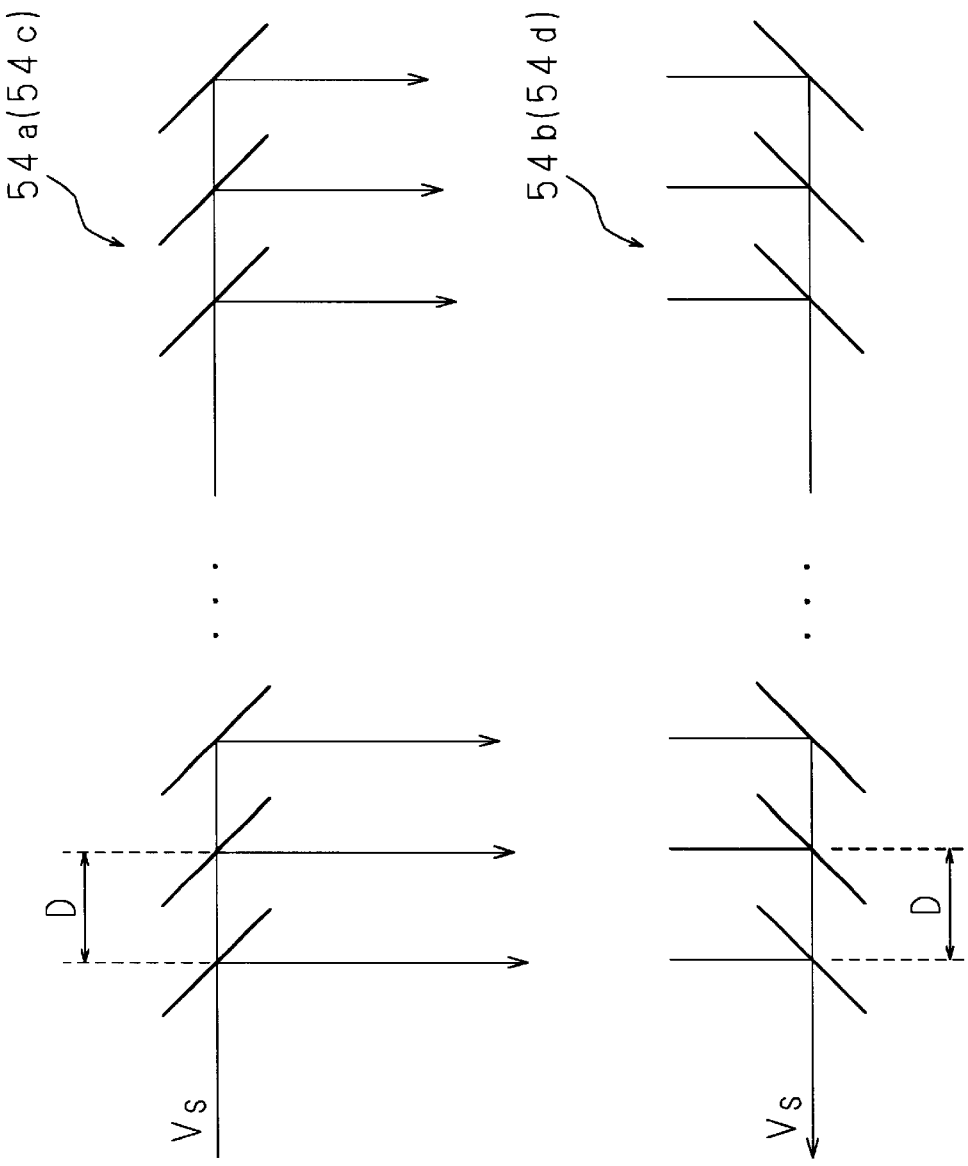
FIG. 2 is an illustration showing how surface acoustic waves are propagated in the first conventional example.
Figure 3:
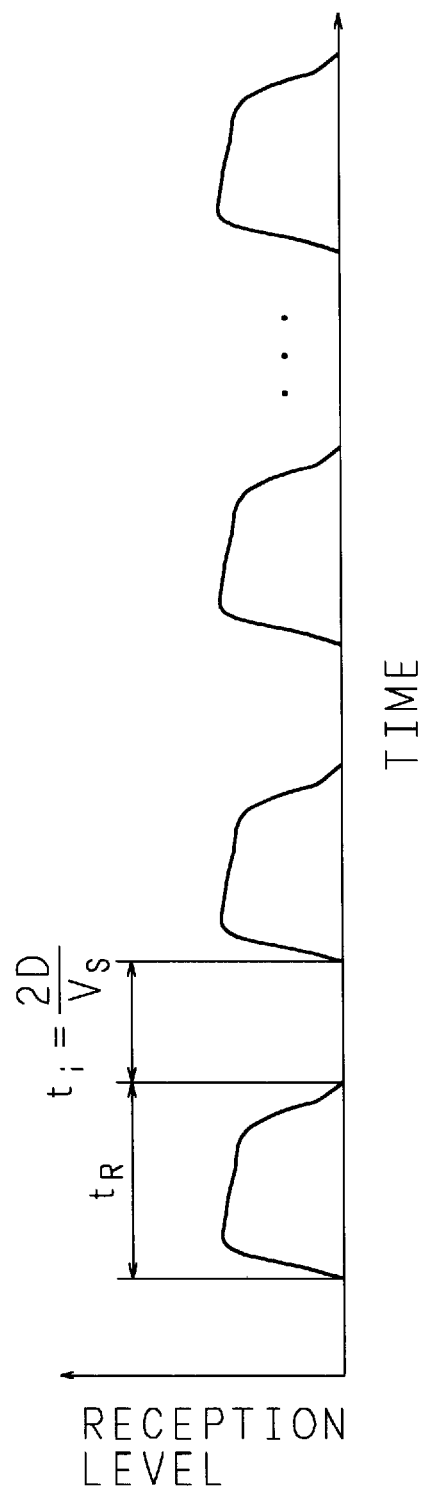
FIG. 3 is an illustration showing the time-series reception signal obtained by the surface acoustic wave receiver of the first conventional example.
Figure 4:
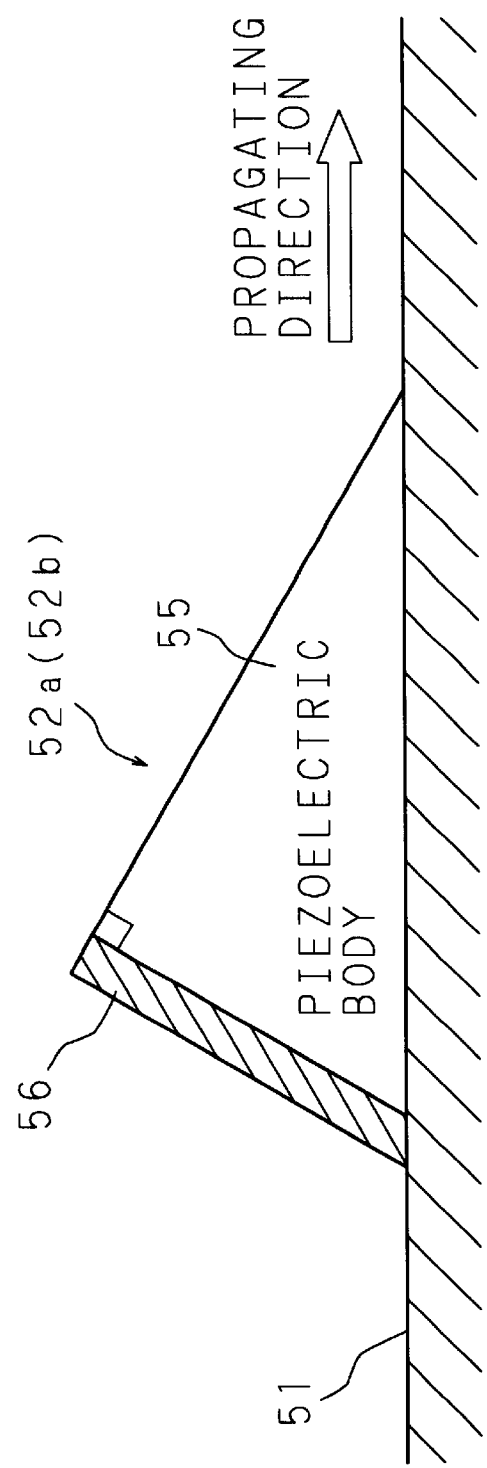
FIG. 4 is an illustration showing a structural example of the surface acoustic wave oscillator of the first conventional example.
Figure 5:
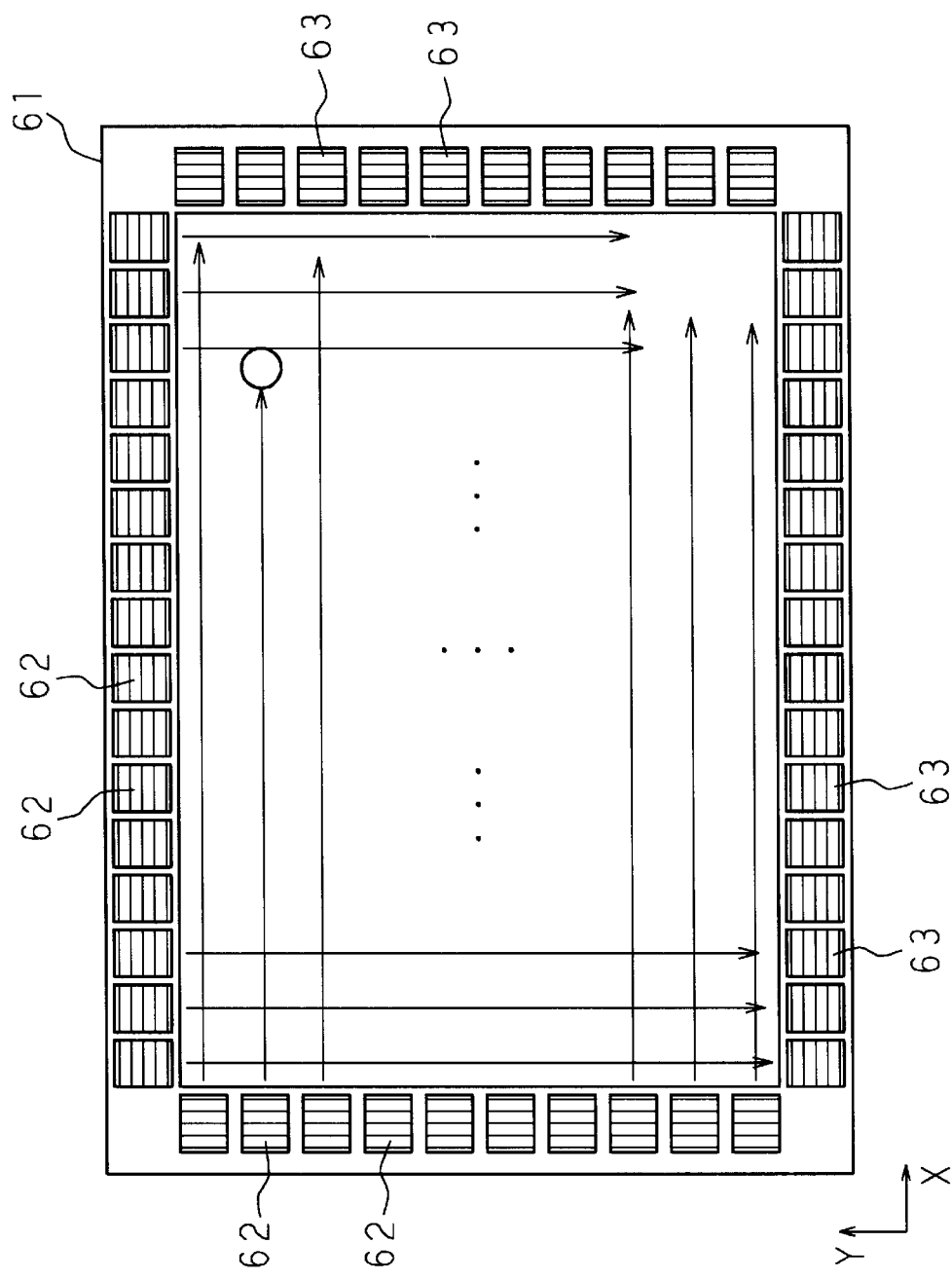
FIG. 5 is an illustration showing the structure of a conventional touch panel device (the second conventional example)
Figure 6:
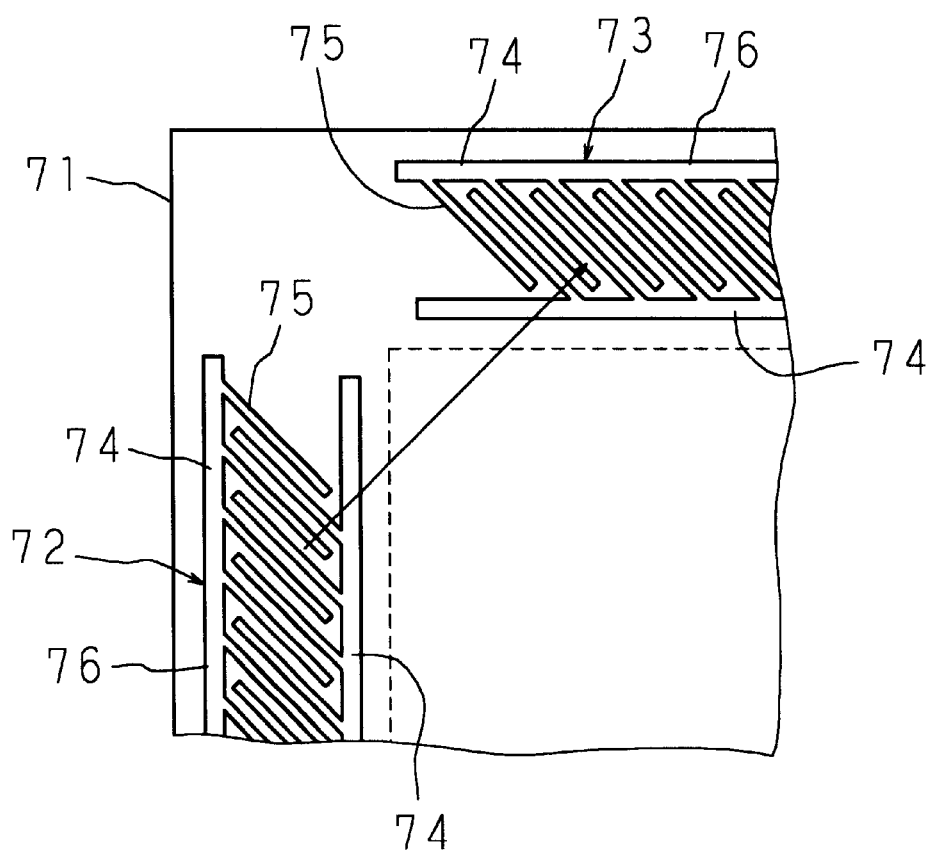
FIG. 6 is an illustration showing the structure of IDTs of a conventional touch panel device (the third conventional example)
Figure 7:
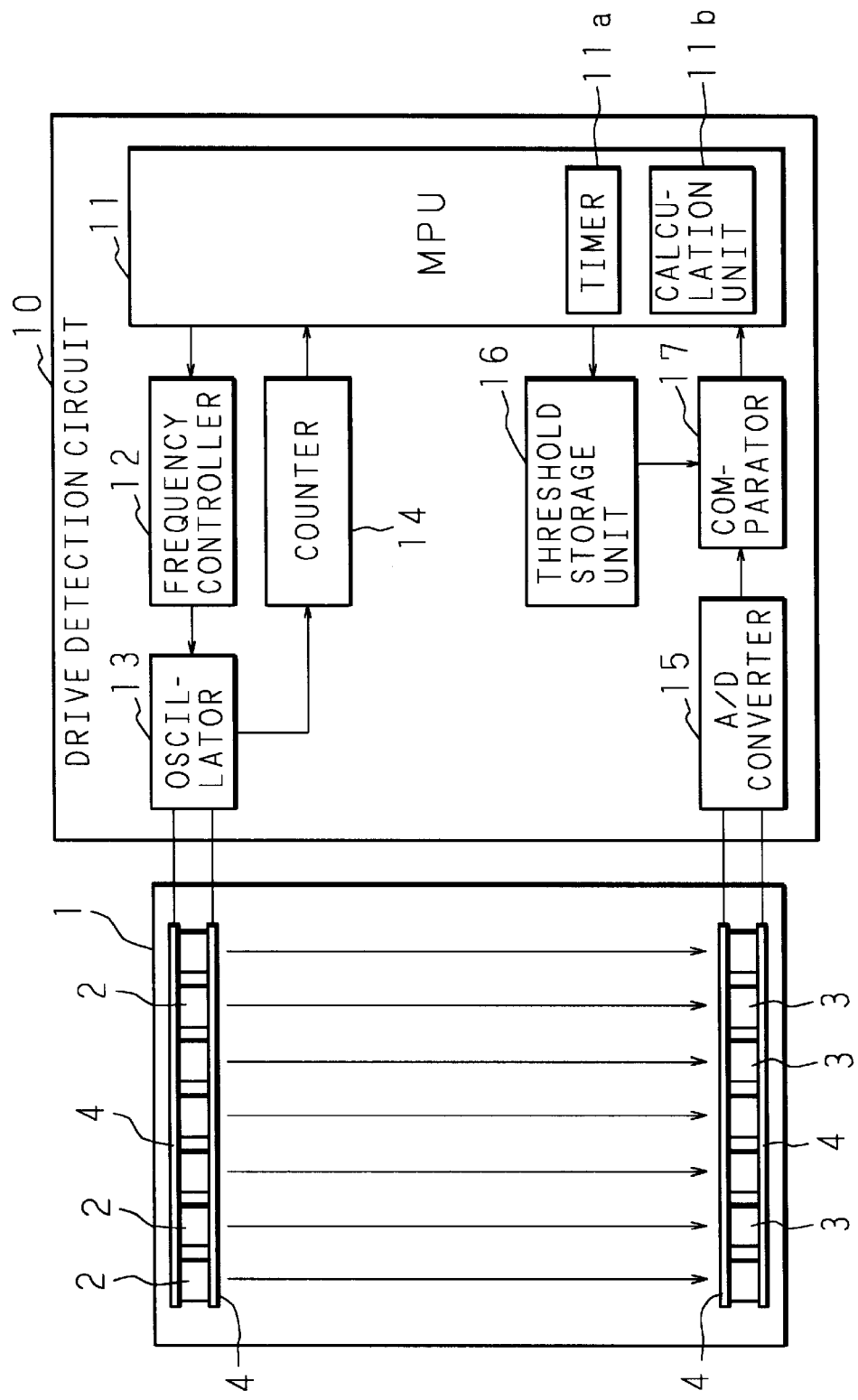
FIG. 7 is a schematic illustration showing the basic structure of a touch panel device according to the first embodiment.

FIG. 7 is a schematic illustration showing the basic structure of a touch panel device according to the first embodiment of the present invention (discrete-IDT type touch panel device). Numeral 1 represents a rectangular substrate capable of propagating a surface acoustic wave. A plurality of excitation elements 2 for exciting surface acoustic waves are arranged into a line at one end of the substrate 1. Moreover, a plurality of receiving elements 3 for receiving the surface acoustic waves are arranged into a line at the other end of the substrate 1 so that the receiving elements 3 face the excitation elements 2.

Figure 8:
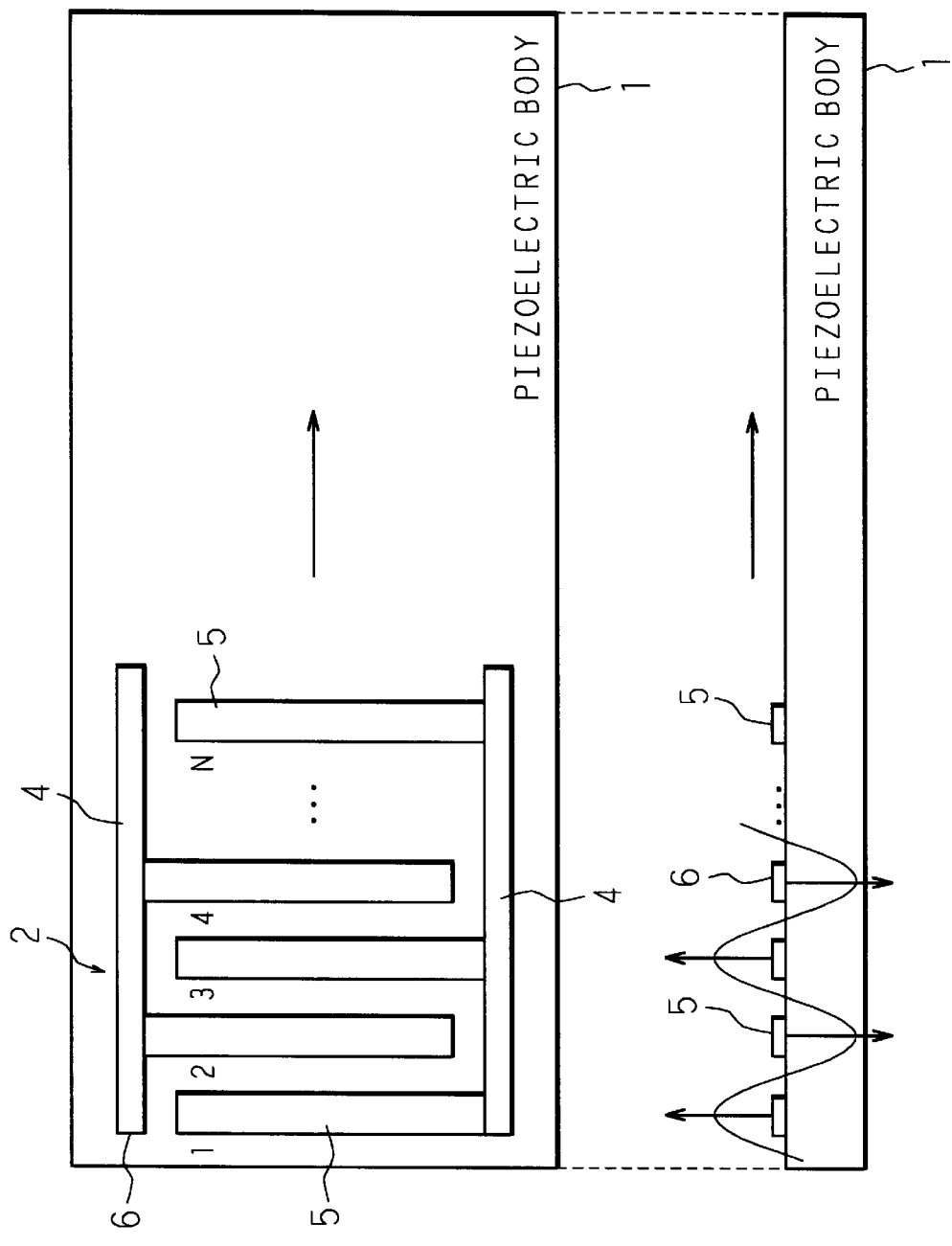
FIG. 8 is an illustration showing one example of the structures of the substrate and excitation element.

FIG. 8 is an illustration showing one example of the structures of the substrate 1 and excitation element 2. In this example, the excitation element 2 is constructed by forming an IDT 6 composed of facing electrode bases 4, 4 as excitation electrodes and N comb-like electrode fingers 5 alternately connected to the electrode bases 4, 4 on the substrate 1 made of a piezoelectric body. The excitation elements 2 excite only surface acoustic waves having pass-band frequencies specified by a predetermined center frequency and a predetermined bandwidth with respect to an input frequency. More specifically, by applying a burst wave of a predetermined frequency to the IDT 6, the vicinity of the surface is distorted by the piezoelectric function and a surface acoustic wave applied in phase with the predetermined frequency is most strongly excited. The surface acoustic wave excited at the predetermined frequency is added whenever it passes through each comb-like electrode finger 5, and the maximum gain becomes N times the surface acoustic wave excited by only one comb-like electrode finger 5.

Figure 9:
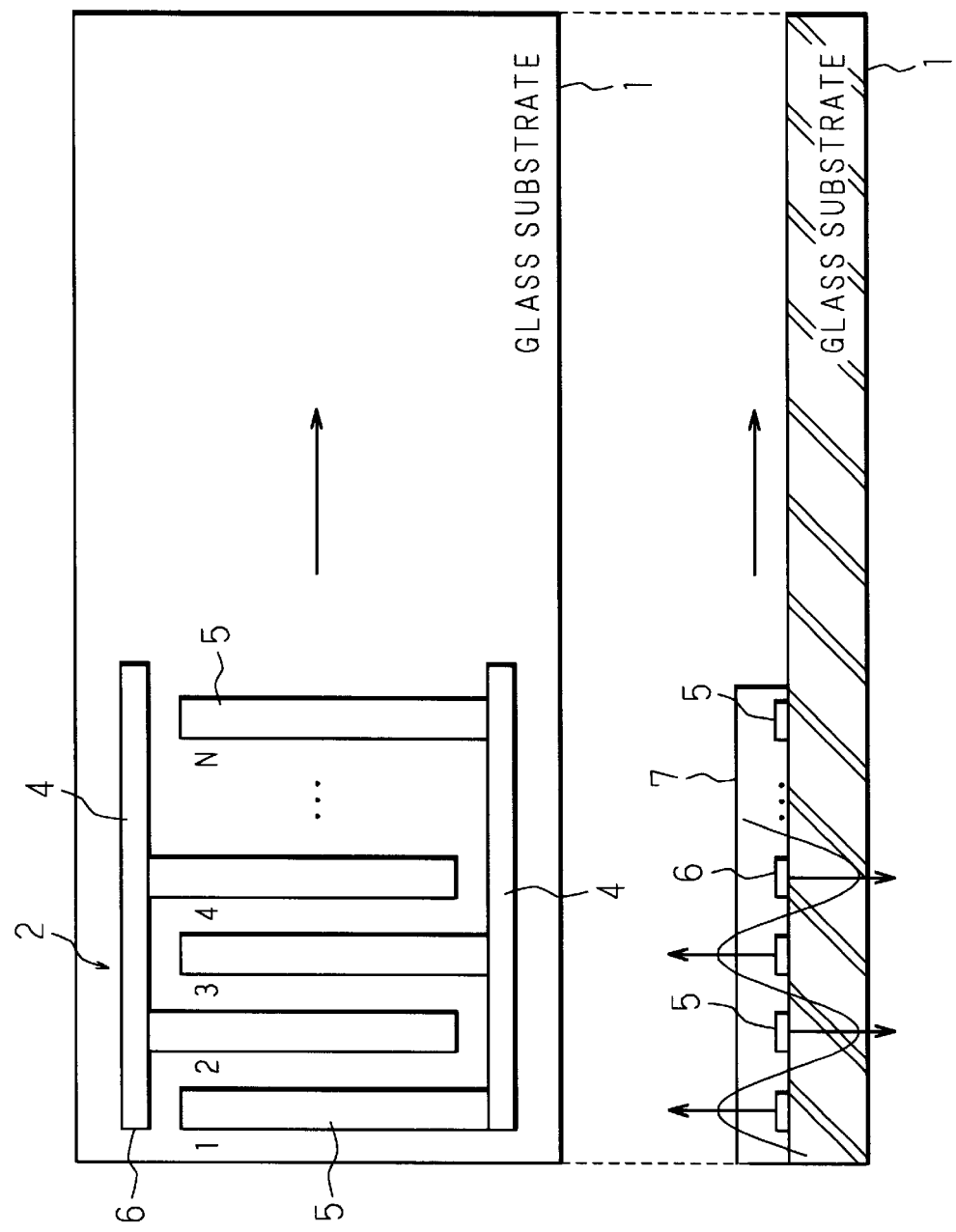
FIG. 9 is an illustration showing another example of the structures of the substrate and excitation element.

FIG. 9 is an illustration showing another example of the structures of the substrate 1 and excitation element 2. In this example, an IDT 6 similar to the example shown in FIG. 8 is formed on the substrate 1 made of a non-piezoelectric body, such as a glass substrate, and s piezoelectric thin film 7 made of ZnO or the like is formed on the IDT 6. In this example, a surface acoustic wave is also excited in the exactly same manner as in the example of FIG. 8.

Moreover, like the excitation elements 2, each of the receiving elements 3 has an IDT composed of facing electrode bases 4, 4 as receiving electrodes and a plurality of comb-like electrode fingers alternately connected to the electrode bases 4, 4 and receives only surface acoustic waves having pass-band frequencies specified in the same manner as in the excitation element 2.

Each electrode base 4 is connected to a drive detection circuit 10. The drive detection circuit 10 comprises an MPU 11, a frequency controller 12, an oscillator 13, a counter 14, an A/D converter 15, a threshold storage unit 16, and a comparator 17. The MPU 11 controls the operations of other members, and also performs processes for detecting the touched position and width of an object based on the comparison results given by the comparator 17, setting a threshold for use in binarization, setting an excitation frequency and setting excitation timing. Further, the MPU 11 incorporates therein a timer 11a and a calculation unit 11b.

The frequency controller 12 controls the excitation frequency according to an instruction given from the MPU 11. The oscillator 13 oscillates a burst wave at a frequency that is determined solely by an input voltage. The oscillated burst wave is applied to the electrode bases 4, and surface acoustic waves are excited by the respective excitation elements 2 at slightly different timings. The counter 14 counts the number of times of oscillation of the oscillator, i.e., the wave number of the burst wave, and sends the counted result to the MPU 11.

The A/D converter 15 connected to the receiving electrode bases 4 obtains a sampling value by sampling the time-series reception signal obtained at the receiving elements 3, and outputs the sampling value to the comparator 17. The comparator 17 compares the threshold stored in the threshold storage unit 16 with the sampling value, and outputs the comparison result (binarization result) to the MPU 11.

In the first embodiment, in order to improve the time resolution, an optimum wave number of the burst wave to be applied is determined by considering the gain of the reception signal obtained at the receiving elements 3 and the number (N) of the comb-like electrode fingers 5 of the IDT 6 of the excitation element 2. The maximum reception signal gain is obtained by applying the same burst wave number as the number (N) of the comb-like electrode fingers 5, but, if the number of times of application of the burst wave exceeds the number of the comb-like electrode fingers 5, the reception signal gain is saturated and fixed. Therefore, if the wave number of the burst wave to be applied is made N that is equal to the number (N) of the comb-like electrode fingers 5, i.e., if the burst wave is applied N times by the oscillator 13, it is possible to efficiently shorten the detection time and improve the time resolution, thereby realizing highly precise detection of the touched position. Accordingly, in the first embodiment, the counter 14 counts the number of times of oscillation given by the oscillator 13, and the MPU 11 controls the oscillator 13 to stop oscillation when the counted result has reached N. As a result, the maximum gain is obtained, and the time resolution is improved.

Figure 10:
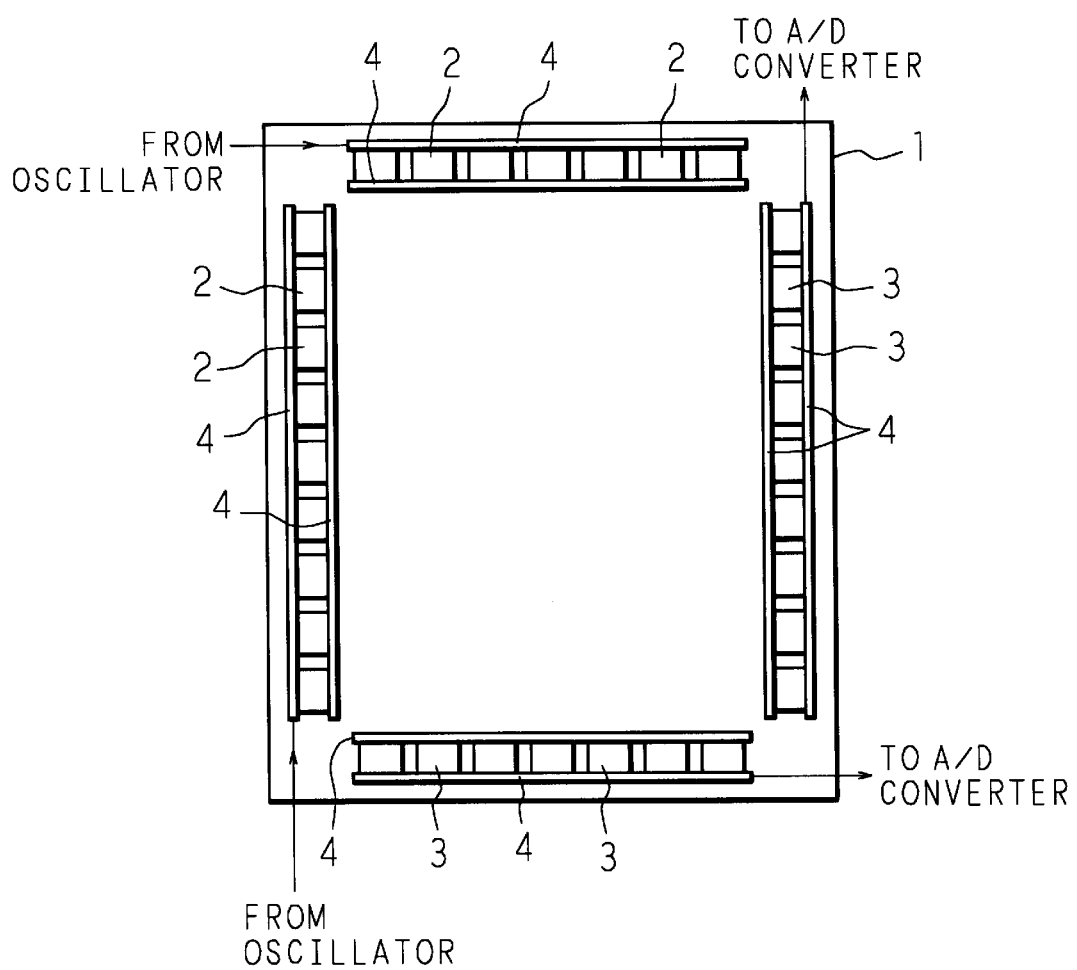
FIG. 10 is an illustration showing another structural example of a touch panel device according to the first embodiment.

FIG. 10 is an illustration showing another structural example of a touch panel device according to the first embodiment (discrete-IDT type touch panel device). In FIG. 10, parts similar to those shown in FIG. 7 are designed with the same numbers, and explanation thereof will be omitted. In addition to one set of a plurality of pairs of the excitation element 2 and receiving element 3 shown in FIG. 7, another set of a plurality of pairs of the excitation element 2 and receiving element 3 is arranged at the remaining ends of the substrate 1 so that the excitation elements 2 and the receiving elements 3 face each other. In such a structural example, since two sets of a plurality of pairs of the excitation element 2 and receiving element 3 are arranged orthogonal to each other, it is possible to detect the two-dimensional touched position of the object.

(Second Embodiment)

Figure 11:
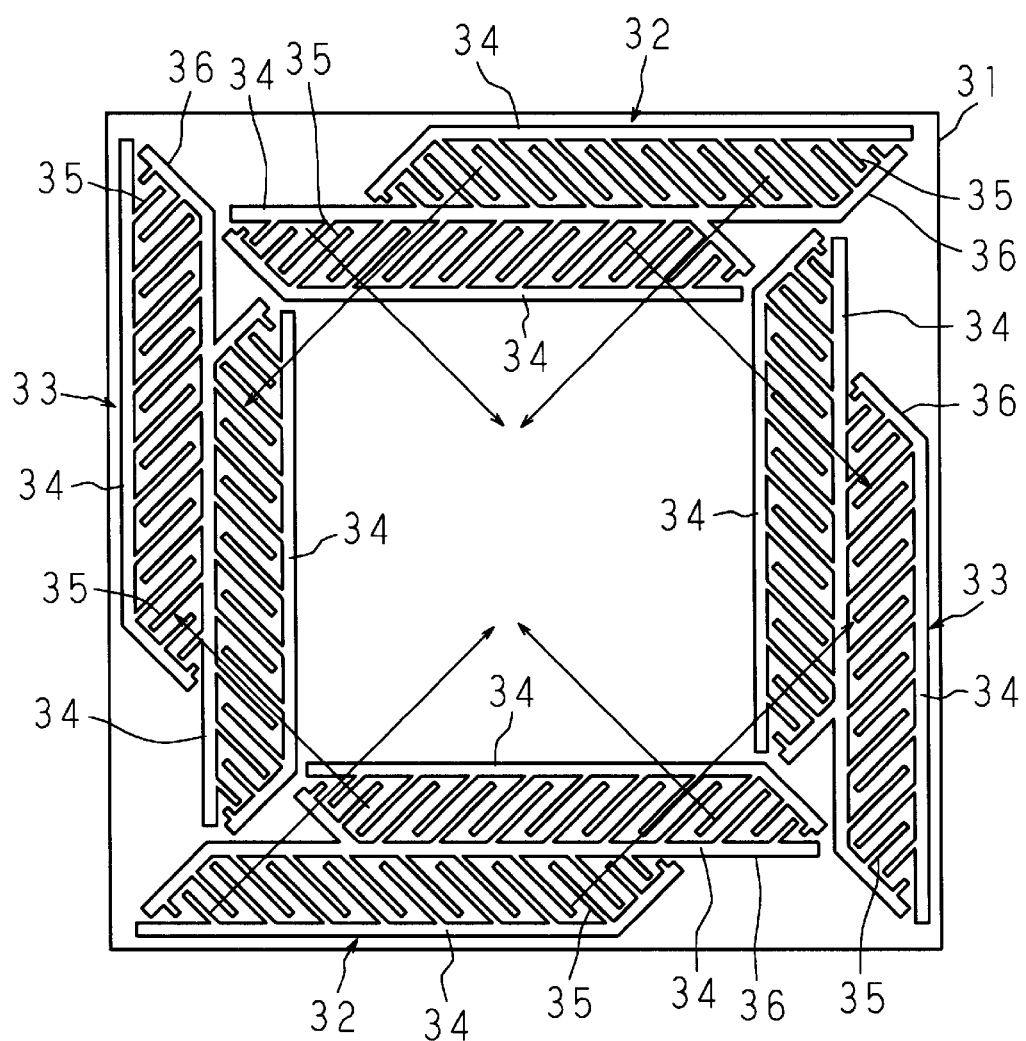
FIG. 11 is a schematic illustration showing the basic structure of a touch panel device according to the second embodiment.

FIG. 11 is a schematic illustration showing the basic structure of a touch panel device according to the second embodiment of the present invention (inclined continuous-IDT type touch panel device). Numeral 31 represents a rectangular substrate that is similar to the substrate 1 of FIG. 7 and capable of propagating a surface acoustic wave. Excitation elements 32 for exciting surface acoustic waves are arranged at one set of facing ends (upper side and lower side) of the substrate 31, and receiving elements 33 for receiving the surface acoustic waves are arranged at the other set of facing ends (left side and right side).

The excitation elements 32 and receiving elements 33 have IDTs 36 of the same structure. Each IDT 36 is constructed by disposing one electrode base 34 serving as a common electrode at the center and two electrode bases 34 functioning as signal electrodes at positions sandwiching the center electrode base 34 and by extending a plurality of comb-like electrode fingers 35 alternately between two sets of the facing electrode bases 34 (between each signal electrode and the common electrode) so that the comb-like electrode fingers 35 are inclined from the facing direction of the electrode bases 34. By applying a burst wave to each of the electrode bases 34 serving as the signal electrodes, the surface acoustic waves are excited in the respective aperture directions and received from the respective aperture directions. The surface acoustic waves in two directions are excited by a single excitation element 32, and the surface acoustic waves from two directions are received by a single receiving element 33. Note that the signal electrodes of each IDT 36 are connected to a drive detection circuit (not shown) having the same structure as the drive detection circuit 10 of FIG. 7.

Figure 12:
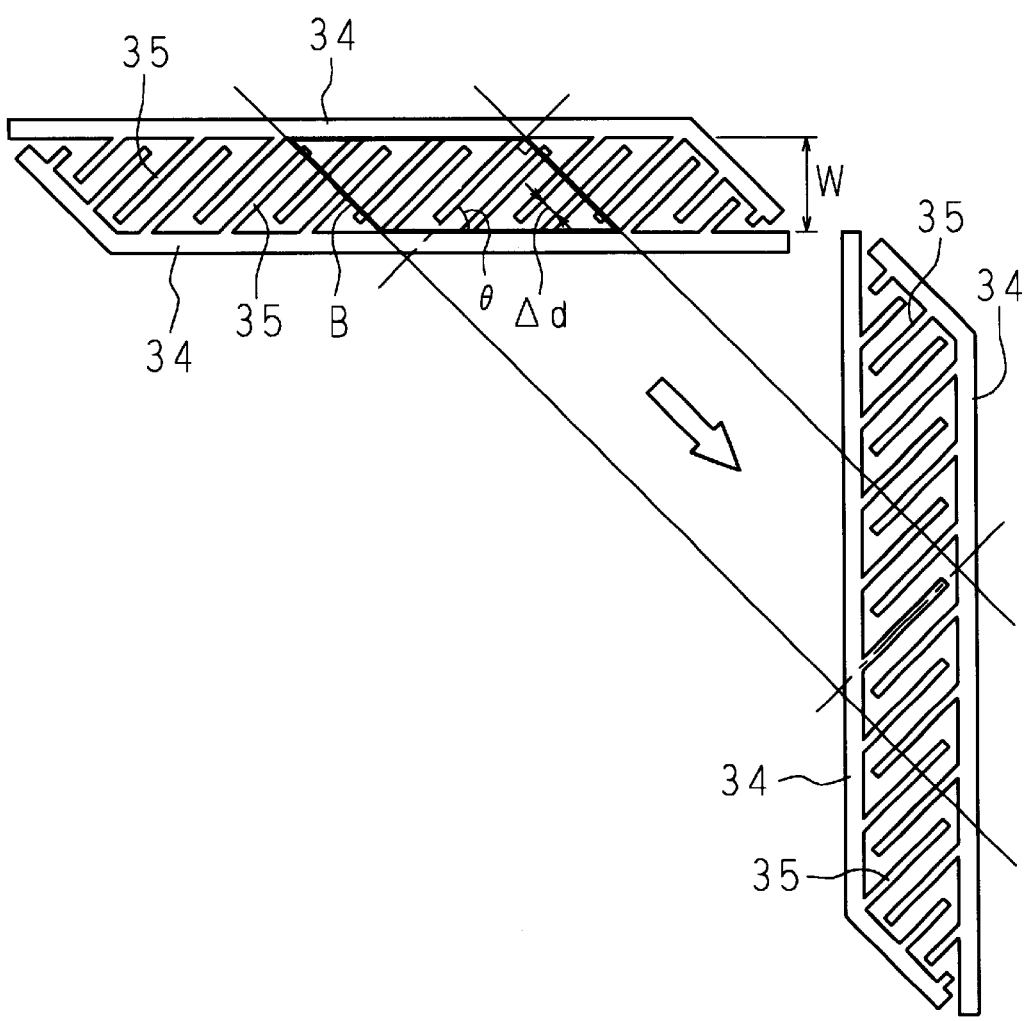
FIG. 12 is an illustration showing facing IDTs according to the second embodiment.

Next, with reference to FIG. 12 showing the facing IDTs, the following description will explain the optimum wave number of the burst wave to be applied in the second embodiment having such a structure. The maximum gain can be obtained by applying the same burst wave number as the number of the comb-like electrode fingers 35 included in a rhombic region B shown in FIG. 12. Here, if the interval between the facing electrode bases 34, 34 is W, the inclination angle (tilt angle) of the comb-like electrode fingers 35 is θ and the formation pitch of the comb-like electrode fingers 35 is Δd, then the number N of the comb-like electrode fingers 35 included in the rhombic region B is given by equation (1) below.

$$N = 2W/(\Delta d \cdot \cos\theta) - 1 \quad (1)$$

Although the comb-like electrode fingers 35 located at the apex of the rhombic region B can hardly affect the gain, if these comb-like electrode fingers 35 are counted, the number N is calculated as shown by equation (2) below.

$$N = 2W/(\Delta d \cdot \cos\theta) + 1 \quad (2)$$

For example, when W=1 mm, Δd=0.25 mm and θ=30°, then, according to equations (1) or (2) above, N=8 or 10.

Figure 13:
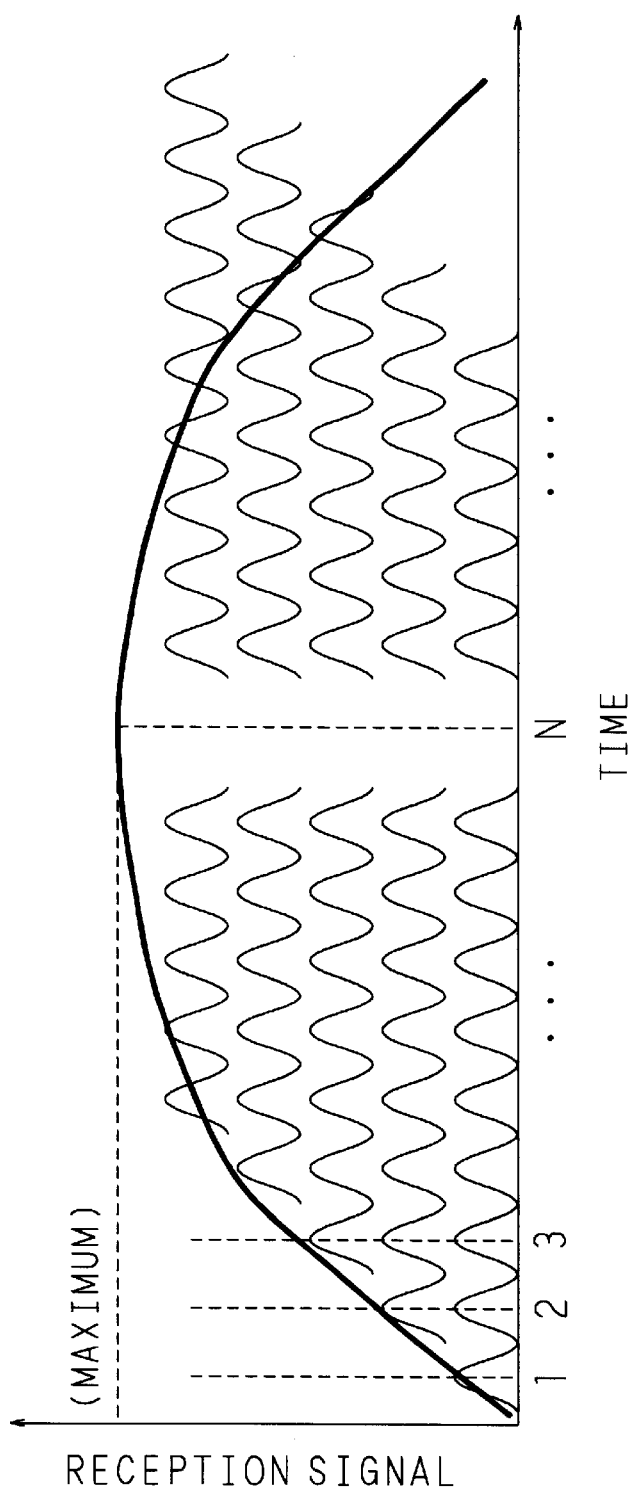
FIG. 13 is a graph showing the magnitude of the reception signal obtained by the receiving element.

FIG. 13 is a graph showing the magnitude of the reception signal obtained at the receiving element 3, 33 when the burst wave is applied to the excitation element 2, 32. Overlapping of the surface acoustic waves of the same phase is saturated when the number of times of application has reached N that is equal to the number of the comb-like electrode fingers 5, 35. It is possible to obtain such a change in the magnitude of the reception signal in activating the device, for example, and determine the wave number (the number of times of application) of the burst wave so that the magnitude of the reception signal becomes maximum.

By determining the wave number of the burst wave in such a manner, it is possible to determine the wave number (the number of times of application) according to the operating environment or the operating conditions specified by the user. It has been reported that, when the magnitude of the reception signal is digitized in 8 bits (256 levels), the touched position can be sufficiently detected with 20 levels of receiving accuracy (Japanese Patent Application Laid-Open No. 10-133818/1998), and the number of times that gives (20×256)×(maximum level of reception signal) may be determined as the wave number (the number of times of application) of the burst wave. By controlling the wave number (the number of times of application) in such a manner, it is also possible to reduce the consumption of power.

Figure 14:
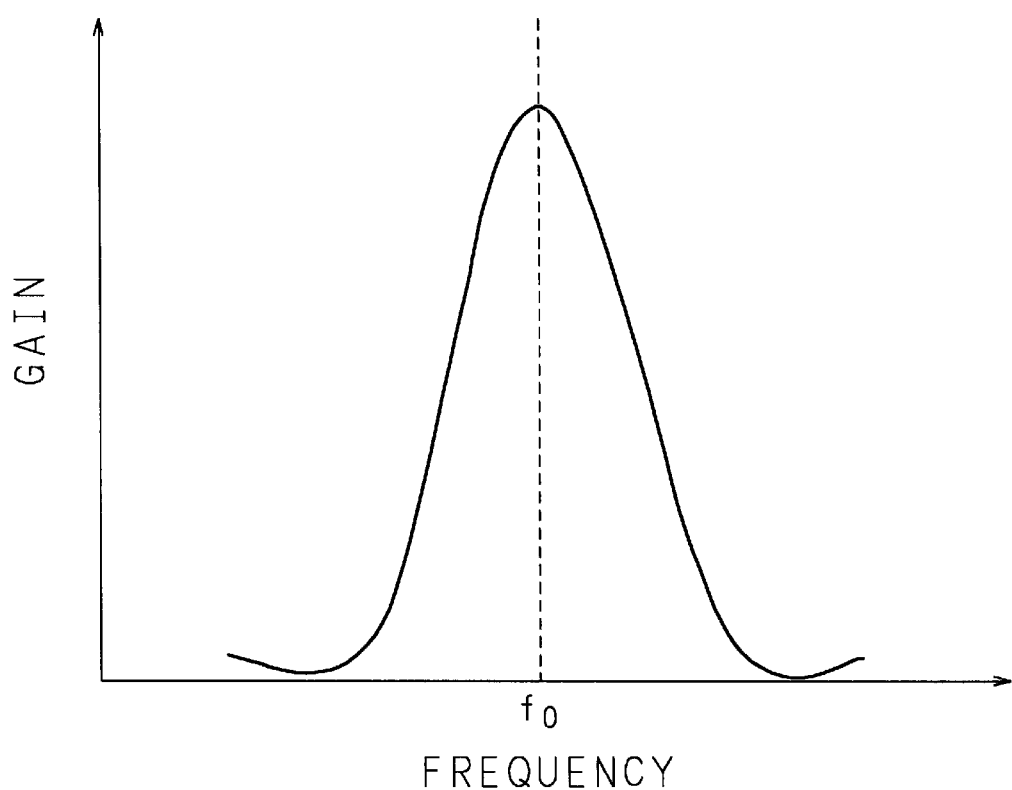
FIG. 14 is a graph showing the frequency characteristics of the IDT.

FIG. 14 is a graph showing the frequency characteristics of the IDT 6, 36 to be used. The IDT 6, 36 has the peak gain at a center frequency $f_0$, and the gain is suddenly lowered when the frequency deviates from the center frequency $f_0$. Therefore, by applying the burst wave while controlling the frequency to an optimum frequency with the frequency controller 12, it is possible to achieve high gain reception. More specifically, a frequency $f_2$ that gives the reception signal of a maximum level is determined by exciting the IDT 6, 36 while varying the frequency within a range of $f_1 \pm \Delta f$ in the vicinity of the present drive frequency $f_1$, in activating the device or at predetermined time intervals when the device is in operation, and the determined frequency $f_2$ is used as the drive frequency thereafter.

Figure 15:
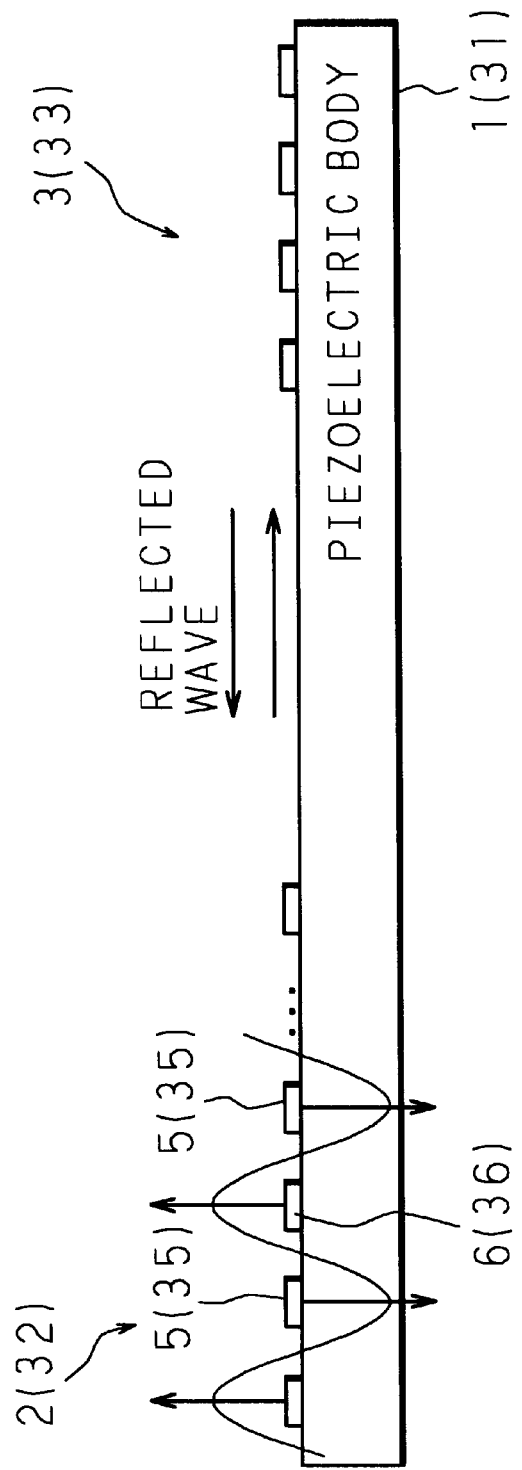
FIG. 15 is an illustration showing the state of the reflected wave of the excited surface acoustic wave.

FIG. 15 is an illustration showing how the surface acoustic wave excited by the excitation element 2, 32 is reflected by the receiving element 3, 33 and enters on the excitation element 2, 32 again. If the time taken for receiving the excited surface acoustic wave from the excitation element 2, 32 is T, then the time taken for receiving the reflected wave is also T. Therefore, by setting the time interval between the burst waves not to be less than T, it is possible to reduce the influence of the reflected wave. Accordingly, in the present invention, the MPU 11 controls the time intervals of the application of the burst wave not to be less than T.

In the case of the discrete-IDT type touch panel device shown in FIG. 7, since the time taken for propagating the surface acoustic wave between the IDT 6 of the excitation element 2 and the IDT 6 of the receiving element 3 is T, when the interval between these IDTs 6 is 3 cm and the propagation speed of the surface acoustic wave is 3000 m/second, for example, T is 10 micro seconds. In the case of the inclined continuous-IDT type touch panel device shown in FIG. 11, since the time taken for propagating the surface acoustic wave along a diagonal line of the substrate 31 is T, when the diagonal line is 4 inches and the propagation speed of the surface acoustic wave is 3000 m/second, for example, T is 33 micro seconds.

Next, the following description will explain a process of binarizing the reception signal obtained at the receiving element 3, 33 and a process of detecting the touched position and touched width based on the binarization result.

Figure 16:
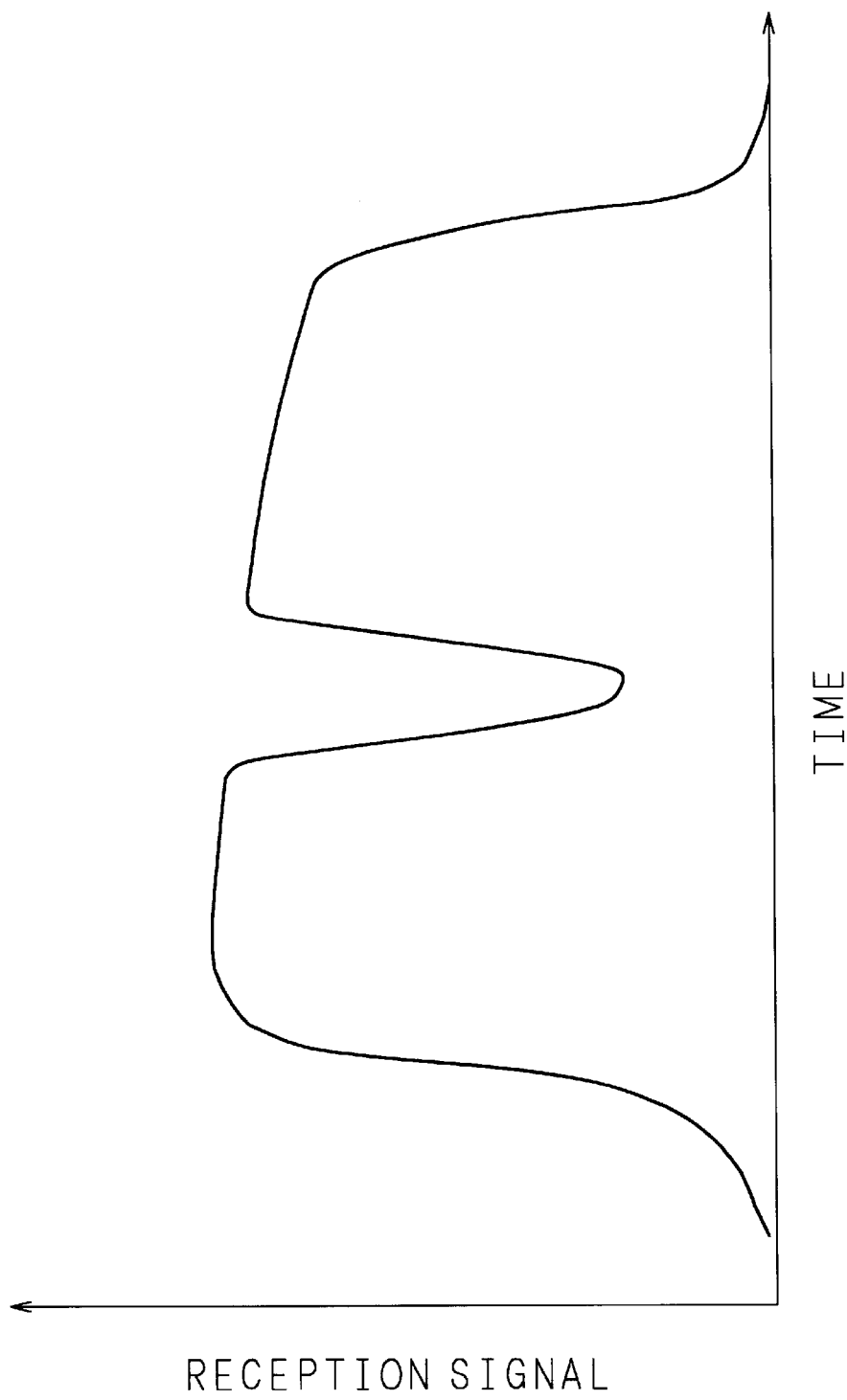
FIG. 16 is an illustration showing time-series change of the reception signal.
Figure 17:
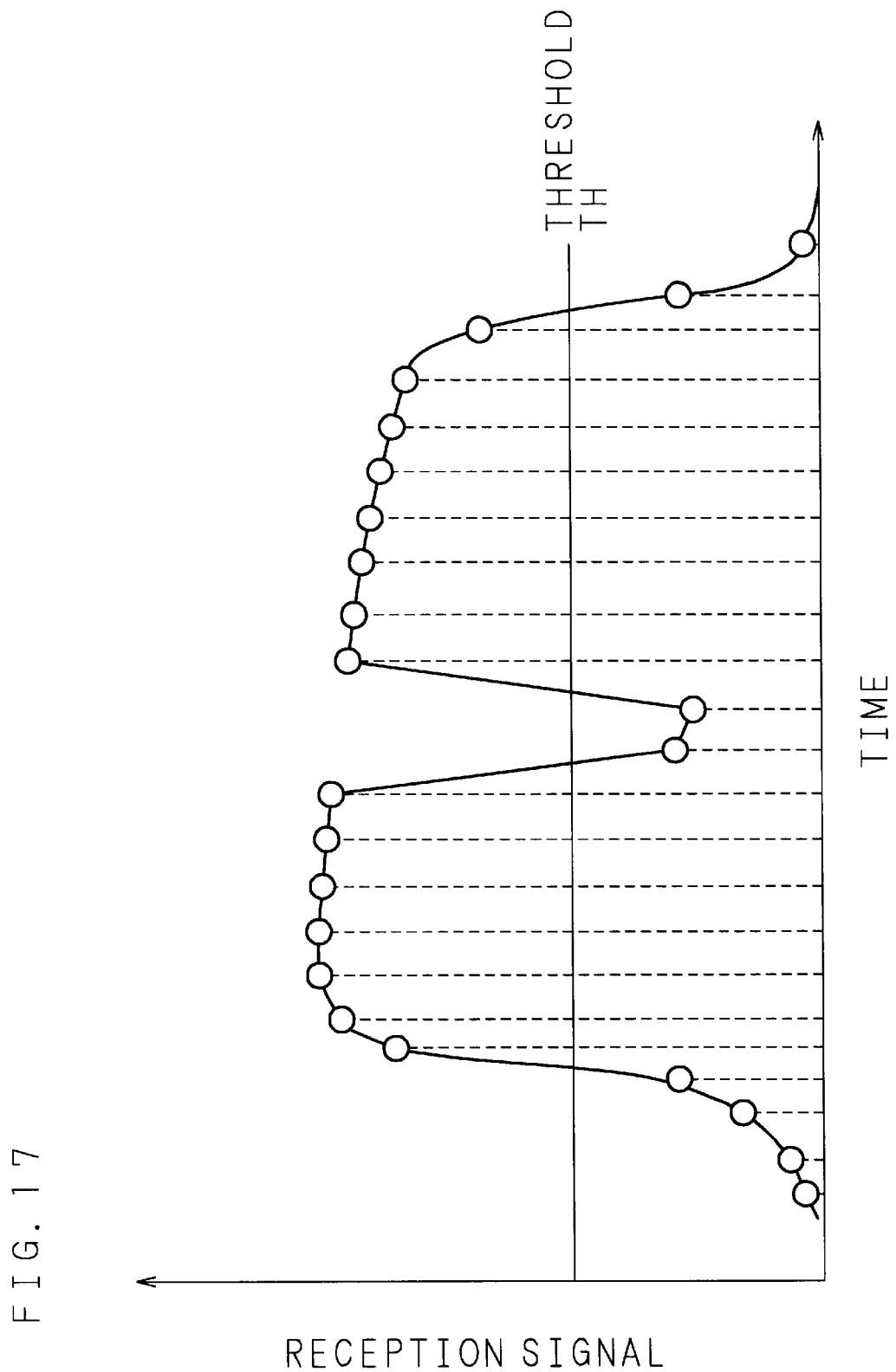
FIG. 17 is an illustration showing an example of sampling the reception signal.

FIG. 16 is an illustration showing time-series change of the reception signal obtained at the receiving element 3, 33, and FIG. 17 is an illustration showing an example of sampling such a reception signal by the A/D converter 15. The level of the reception signal obtained at each sampling point and a predetermined threshold TH stored in the threshold storage unit 16 are compared by the comparator 17, and the reception signal is binarized. This binarization result is inputted to the MPU 11.

FIG. 18 is an illustration showing this binarization result. The internal timer 11a of the MPU 11 times a detection start time $T_0$, a time $T_1$ for transition from rise to fall, and a time $T_2$ for transition from fall to rise. Besides, in the case of the discrete-IDT type touch panel device shown in FIG. 7, a time $t_1$ (=$T_1$-$T_0$) between the start of detection and the transition to fall and a time $t_2$ (=$T_2$-$T_1$) between the fall to the next transition to rise are respectively obtained, and the calculation unit 11b calculates the touched position of the object by $V_s t_1$ and also calculates the touched width of the object by $V_s t_2$, where $V_s$ is the propagation speed of the surface acoustic wave.

Next, the following description will explain an example of setting a threshold independently for each sampling point. FIG. 19 is an illustration showing the result of sampling the reception signal when the substrate 1, 31 is dirty and therefore, even if the object does not touch, the surface acoustic wave is attenuated to a level much lower than the threshold TH at that dirty portion. In such a case, when the reception signal is binarized based on a common threshold TH at all the sampling points, even if the object does not touch, the touch of the object is erroneously detected at the dirty portion, and thus it is impossible to distinguish between dirt and the object.

Hence, the present invention sets different thresholds for the respective sampling points, stores the respective thresholds in the threshold storage unit 16, and binarizes the reception signal by using different thresholds for the respective sampling points. For example, during activation of the device, the reception signal level at each sampling point is detected, and a half of the level is set as a threshold for each sampling point and stored in the threshold storage unit 16. Accordingly, as shown in FIG. 19, since the thresholds for two sampling points covered with dirt (the reception signal levels $V_k$, $V_{k+1}$ when the object does not touch) are $V_k/2$, $V_{k+1}/2$, it is possible to prevent erroneous detection due to dirt.

Moreover, in the touch panel device of the present invention, since the wave number of the burst wave is optimized, it is possible to improve the time resolution and realize highly precise detection of the touched position.

Furthermore, in the touch panel device of the present invention, since an optimum frequency of driving the IDT is determined and used, even when the operating environment and operating conditions are changed, it is possible to always achieve high gain reception.

Besides, in the touch panel device of the present invention, since the time interval between burst waves is set not to be less than the reception time of the surface acoustic wave at the receiving element, it is possible to prevent the influence of the reflected wave and accurately detect the touched position.

Additionally, in the touch panel device of the present invention, since a threshold for use in binarization is set individually for each sampling point, it is possible to accurately detect the touched position without receiving the influence of dirt and so on.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A touch panel device comprising:

a substrate propagating a surface acoustic wave;

at least one pair of excitation element and receiving element disposed to face each other on said substrate, said excitation element having an IDT composed of facing electrode bases and comb-like electrode fingers connected to said electrode bases and exciting a surface acoustic wave by application of a burst wave, said receiving element having an IDT composed of facing electrode bases and comb-like electrode fingers connected to said electrode bases and receiving the surface acoustic wave; and a detection unit for detecting a position of an object touching said substrate, based on a result of receiving the surface acoustic wave propagated on said substrate from said excitation element, at said receiving element, wherein a wave number of the burst wave to be applied to said excitation element is determined according to the number of said comb-like electrode fingers of said IDT of said excitation element.

2. The touch panel device of claim 1, wherein a drive frequency of said IDT of said excitation element is determined according to results of receiving surface acoustic waves, which were excited at different frequencies by said excitation element, at said receiving element.

3. The touch panel device of claim 1, wherein a time interval between sequential burst waves to be applied to said excitation element is not less than a reception time of the surface acoustic wave at said receiving element.

4. The touch panel device of claim 1, wherein said detection unit binarizes a reception signal obtained by said receiving element based on a predetermined threshold, and detects the position of said object based on the binarization result.

5. The touch panel device of claim 1, wherein said detection unit comprises a first detector for detecting the position of said object based on a first timing representing a transition from rise to fall of a binarized signal obtained by binarizing a reception signal obtained by said receiving element based on a predetermined threshold, and a second detector for detecting a width of said object based on the first timing and a second timing representing a transition from fall to rise of the binarized signal.

6. The touch panel device of claim 4, wherein said detection unit extracts a plurality of sampling points for the reception signal obtained by said receiving element, and sets the threshold for use in the binarization, for each of the plurality of sampling points.

7. A touch panel device comprising:

a rectangular substrate propagating a surface acoustic wave;

at least one pair of excitation element and receiving element disposed at peripheral sections in a diagonal direction of said substrate, said excitation element having an IDT composed of facing electrode bases and comb-like electrode fingers connected to said electrode bases and exciting a surface acoustic wave by application of a burst wave, said receiving element having an IDT composed of facing electrode bases and comb-like electrode fingers connected to said electrode bases and receiving the surface acoustic wave; and a detection unit for detecting a position of an object touching said substrate, based on a result of receiving the surface acoustic wave propagated from said excitation element in a diagonal direction on said substrate, at said receiving element, wherein said comb-like electrode fingers of said IDTs of said excitation element and said receiving element are connected to said electrode bases so that said comb-like electrode fingers are inclined from a facing direction of said electrode bases, and a wave number of the burst wave to be applied to said excitation element is determined according to an interval between said electrode bases of said IDT of said excitation element and an inclination angle and interval of said comb-like electrode fingers of said IDT of said excitation element.

8. The touch panel device of claim 7, wherein a drive frequency of said IDT of said excitation element is determined according to results of receiving surface acoustic waves, which were excited at different frequencies by said excitation element, at said receiving element.

9. The touch panel device of claim 7, wherein a time interval between sequential burst waves to be applied to said excitation element is not less than a reception time of the surface acoustic wave at said receiving element.

10. The touch panel device of claim 7, wherein said detection unit binarizes a reception signal obtained by said receiving element based on a predetermined threshold, and detects the position of said object based on the binarization result.

11. The touch panel device of claim 7, wherein said detection unit comprises a first detector for detecting the position of said object based on a first timing representing a transition from rise to fall of a binarized signal obtained by binarizing a reception signal obtained by said receiving element based on a predetermined threshold, and a second detector for detecting a width of said object based on the first timing and a second timing representing a transition from fall to rise of the binarized signal.

12. The touch panel device of claim 10, wherein said detection unit extracts a plurality of sampling points for the reception signal obtained by said receiving element, and sets the threshold for use in the binarization, for each of the plurality of sampling points.

13. A touch panel device comprising:

a substrate propagating a surface acoustic wave;

at least one pair of excitation element and receiving element disposed to face each other on said substrate, said excitation element having an IDT composed of facing electrode bases and comb-like electrode fingers connected to said electrode bases and exciting a surface acoustic wave by application of a burst wave, said receiving element having an IDT composed of facing electrode bases and comb-like electrode fingers connected to said electrode bases and receiving the surface acoustic wave; and a detection unit for detecting a position of an object touching said substrate, based on a result of receiving the surface acoustic wave propagated on said substrate from said excitation element, at said receiving element, wherein a wave number of the burst wave to be applied to said excitation element is determined according to a result of receiving the surface acoustic wave, which was excited by the application of the burst wave to said excitation element, at said receiving element.

14. The touch panel device of claim 13, wherein a drive frequency of said IDT of said excitation element is determined according to results of receiving surface acoustic waves, which were excited at different frequencies by said excitation element, at said receiving element.

15. The touch panel device of claim 13, wherein a time interval between sequential burst waves to be applied to said excitation element is not less than a reception time of the surface acoustic wave at said receiving element.

16. The touch panel device of claim 13, wherein said detection unit binarizes a reception signal obtained by said receiving element based on a predetermined threshold, and detects the position of said object based on the binarization result.

17. The touch panel device of claim 13, wherein said detection unit comprises a first detector for detecting the position of said object based on a first timing representing a transition from rise to fall of a binarized signal obtained by binarizing a reception signal obtained by said receiving element based on a predetermined threshold, and a second detector for detecting a width of said object based on the first timing and a second timing representing a transition from fall to rise of the binarized signal.

18. The touch panel device of claim 16, wherein said detection unit extracts a plurality of sampling points for the reception signal obtained by said receiving element, and sets the threshold for use in the binarization, for each of the plurality of sampling points.

* * * * *